US011060300B2

(12) United States Patent
Wedi (10) Patent No.: US 11,060,300 B2
(45) Date of Patent: Jul. 13, 2021

(54) METHOD FOR RENOVATING AND RECONSTRUCTING WET ROOMS, AND RENOVATION SET FOR THIS PURPOSE (71) Applicant: wedi GmbH, Emsdetten (DE)

(72) Inventor: Stephan Wedi, Emsdetten (DE)

(73) Assignee: wedi GmbH, Emsdetten (DE)

( * ) Notice: Subject to any disclaimer, the term of this patent is extended or adjusted under 35 U.S.C. 154(b) by 0 days.

(21) Appl. No.: 16/607,527

(22) PCT Filed: Apr. 26, 2018

(86) PCT No.: PCT/EP2018/060772
§ 371 (c)(1),
(2) Date: Oct. 23, 2019

(87) PCT Pub. No.: WO2018/197629
PCT Pub. Date: Nov. 1, 2018

(65) Prior Publication Data
US 2020/0141128 A1 May 7, 2020

(30) Foreign Application Priority Data
Apr. 27, 2017 (DE) .......................... 102017109075.4

(51) Int. Cl.
E04F 15/02 (2006.01)
E04F 15/18 (2006.01)

(52) U.S. Cl.
CPC ...... *E04F 15/02005* (2013.01); *E04F 15/182* (2013.01); *B32B 2607/00* (2013.01);
(Continued)

(58) Field of Classification Search
CPC .............. E04F 15/02188; E04F 15/182; E04F 15/02005
See application file for complete search history.

(56) References Cited

U.S. PATENT DOCUMENTS 10,533,323 B2 * 1/2020 Nielsen ................. B32B 37/153
2002/0088524 A1 * 7/2002 Gregg ..................... C04B 38/02
156/41
(Continued)

FOREIGN PATENT DOCUMENTS

CH 681651 A5 4/1993
CH 682246 A5 8/1993
(Continued)

OTHER PUBLICATIONS

Deutches Patent—Und Markenamt (German Patent and Trademark Office), Recherchebericht (search in a related application), Mar. 8, 2018.
(Continued)

*Primary Examiner* — Babajide A Demuren
(74) *Attorney, Agent, or Firm* — Laurence P. Colton; Smith Tempel Blaha LLC (57) ABSTRACT A method and kit for renovating and reconstructing wet rooms, wherein panel modules are attached to a wall, floor, and/or ceiling of the wet room, by providing panel modules having a water-impermeable coating or core; determining an installation position of a panel module; attaching a water-resistant sealing strip section to form an outer contour of the panel module; applying a water resistant sealing adhesive to the sealing strip section such that the sealing adhesive continuously underlays edge regions of two adjacent panel modules; and pressing a first panel module onto a first subregion of the sealing adhesive and a second panel module adjoining the first panel module whereby the two adjacent side regions of the panel modules are completely underlaid with sealing adhesive to produce a seal point between the panel modules to prevent moisture from entering the wall, floor, or ceiling through a joint formed between the panel modules.

15 Claims, 8 Drawing Sheets (52) U.S. Cl.
CPC ... *E04F 15/02188* (2013.01); *E04F 15/02194* (2013.01); *E04F 2201/0153* (2013.01)

(56) References Cited

U.S. PATENT DOCUMENTS

| | | | | |
|---|---|---|---|---|
| 2002/0090871 | A1* | 7/2002 | Ritchie | E04C 2/043 |
| | | | | 442/42 |
| 2006/0151543 | A1* | 7/2006 | Longo, II | B65D 83/0005 |
| | | | | 222/327 |
| 2006/0154015 | A1* | 7/2006 | Miller | E04F 15/085 |
| | | | | 428/50 |
| 2013/0097944 | A1* | 4/2013 | Van Ravenhorst | E04F 13/165 |
| | | | | 52/35 |
| 2019/0078329 | A1* | 3/2019 | Ulici | E04F 13/0862 |

FOREIGN PATENT DOCUMENTS

| | | | |
|---|---|---|---|
| DE | 202010003239 | U1 | 7/2010 |
| DE | 102011114001 | A1 | 3/2013 |
| EP | 1088944 | A2 | 4/2001 |

OTHER PUBLICATIONS

WIPO, International Serach Report (in the priority application), dated Jul. 16, 2018.
WEDI GMBH, Abdichten und Entkoppeln Wissenswertes und Technik, Mar. 22, 2013.
WEDI GMBH, Erstellen bodengleicher Duschen, May 13, 2013.

* cited by examiner

METHOD FOR RENOVATING AND RECONSTRUCTING WET ROOMS, AND RENOVATION SET FOR THIS PURPOSE

CROSS REFERENCE TO RELATED APPLICATIONS

This patent application is the US National Phase and claims priority on International Application No. PCT/EP2018/060772 having an international filing date of 26 Apr. 2018, which claims priority on and the benefit of German Patent Application No. 10 2017 109 075.4 having a filing date of 27 Apr. 2017.

BACKGROUND OF THE INVENTION

Technical Field

The invention relates to a method for the renovation and new construction of wet rooms, such as kitchens, washrooms and bathrooms, in which large-format panel modules are attached to a wall and/or a floor and/or a ceiling of the wet room.

Prior Art

Said panel modules are particularly applicable for the new construction of wet rooms using drywall construction and for renovating existing wet rooms. As stipulated by building regulations, structural installations are to be executed to prevent the occurrence of hazards or unreasonable inconveniences caused by water or moisture, as well as by other chemical, physical or biological factors. For this reason, structural installations exposed to moisture must be protected against moisture penetration.

For the new construction of indoor wet rooms, drywall construction with substructures made of wood or metal, planked with panel-shaped materials and in combination with waterproofing systems in bathrooms and wet rooms, have proved successful for decades and are regarded as the generally acknowledged rule of technology. Drywall construction also includes partition walls made of plaster wallboards employed in housing construction. Drywall constructions are employed for bathrooms and wet rooms in hotels, hospitals, schools, office buildings and housing construction, regardless of the construction method.

In the case of known methods for renovating existing wet rooms, renovation often entails the initial fixing of prefabricated panel modules to the surfaces of the walls and/or floors and/or ceilings. Such existing wall, floor or ceiling surfaces can also be designated as existing surfaces. The panel modules may be building panels made of plasterboard or extruded polystyrene. For attaching the panel modules, in general an adhesive is initially applied to the floor, wall or ceiling of the wet room. Immediately thereafter, the panel module is pressed on and fixed at the desired position by appropriate adjustment to achieve the correct perpendicular and flush alignment. The remaining panel modules are then fixed into place, whereby, as a result, the area to be renovated is covered to the desired extent with panel modules laid side by side.

In order to seal the joints remaining between the panel modules after they have been fixed in place, sealing strips are glued on and levelled out on the accessible visible side of the butted edges and on the wall corners or in the corner of the floor and wall. Since this is an "overlay construction", a sealing adhesive is generally used which exhibits good bonding as well as sealing properties. Inasmuch as a wearing layer, for example a tile covering, is later to be applied over these seal points, the sealing strips are aesthetically unobtrusive and provide a reliable seal against the penetration of water into the joint and wall.

However, a subsequently applied wearing layer is not in every case able to conceal any sealing strips lying directly under the wearing layer. If, for example, the tile covering comprises mosaic tile, whose often small individual parts are connected by a fabric on the rear side, then these mosaic elements have a flexibility which makes any unevenness present in the subsurface visible from the front side when fully assembled. A sealing strip applied directly under a mosaic tile mat can thus be seen as unevenness on the visible side.

If, however, the panel modules already have a wearing layer or if the panels are those which are not meant to be covered by an additional wearing layer, for example panels of natural stone, then, for aesthetic reasons, the joints can no longer be taped over with wide sealing strips after the panel modules have been mounted. In this case, the joints remaining between the panel modules can only be sealed by applying sealant to the joints, for example silicone or sealing glue. This type of joint sealing is basically a question of maintenance, since silicone and sealing glue are subject to certain aging processes and as a general rule must be renewed sooner or later. The sealing of joints following the mounting of panel modules and without the use of sealing strips for covering the joints is thus problematical and frequently not water-tight on a permanent basis. Furthermore, it is visually annoying if the joints between the panel modules look different than the joints between the tiles on the panel modules. What is desired instead is that the transition points between two panel modules in their final assembled state are inconspicuous or even, in the ideal case, undetectable.

Known from CH 682246 A5 is a method for the sealing of joints where, as already discussed, a joint located between two wall sections is first covered with a special-purpose sealing strip and the wall surfaces thus sealed are provided with a tile covering.

Using an analogous procedure it is also possible to seal pipe passages in a wall surface. Known from CH 681651 A5 is a sealing collar for sealing a pipe passage in a wall surface. The sealing collar is provided for sealing a joint located between a pipe and the pipe passage. For this purpose, the sealing collar has a diameter that is slightly smaller than that of the pipe. In addition, it is elastic and can therefore be slipped over the pipe. The sealing collar placed over the pipe is first bonded onto the wall surrounding the pipe passage, analogous to the sealing strip known from CH 682246 A5. This is followed by the application of a mortar layer on the top surface of the sealing collar, after which a covering of tiles or plastic material is applied.

Thus, two methods are known from the prior art for the sealing of joints. For one, any joints present after a wall covering has been mounted can be sealed by means of a joint sealant, such as silicone. For another, it is known to seal joints by means of sealing strips or sealing collars and then to cover the generally unsightly sealing strips with a top layer, for example a tile covering.

In the known prior art, the sealing operation is, as a rule, carried out from the side facing the room, i.e. the front side.

The known sealing strip method is well suited for individual applications where the wearing layer is applied separately after the panel modules have been mounted and sealed.

The known method in which a visible surface is first produced and the resulting joints between the panels being sealed with a sealing compound such as silicone or mortar for joining, is well suited for surfaces where there are no special water tightness requirements.

Especially when renovating larger units with recurring local conditions, such as hospitals, student dormitories, hotels and other public buildings that need to be renovated for various reasons, simultaneous renovation of many wet rooms is a problem. The time frame available for the renovation project is often limited in duration and thus places an enormous time pressure on the construction companies contracted for the renovation. For such applications, an efficient working method using prefabricated panel modules provided with a wearing layer is desirable as well as a permanently water-tight and impermeable sealing of the joints.

BRIEF SUMMARY OF THE INVENTION

Thus, the object is to provide a method for the renovation of wet rooms, for example in public buildings, with which the described disadvantages can be avoided and that the renovation measures are efficient and can be carried out while ensuring the desired water tightness. Furthermore, the method should meet the requirements inherent in the relevant standards, in particular DIN 18534.

This object is solved by the method claimed herein.

The panel modules of consideration for the renovation of wet rooms can be building panels with or without an applied wearing layer. The term wearing layer refers to a tile covering or some other type of covering.

The panel modules can also have a multilayer construction in that the panel module is based on a building panel and has a fiber-reinforced top layer embedded in mortar. A building panel is understood both in drywall construction as well as in the tiling trade to mean a panel that is produced on the basis of a foam core, preferably an extruded or expanded polystyrene rigid foam core, and which preferably has fabric-reinforced cementitious coating on both sides.

Furthermore, a multilayer panel module can be provided with a wearing layer by means of an adhesive layer. Such panel modules can be industrially prefabricated and will be designated in the following as prefabricated panel modules.

Glass panels or natural stone can also be provided as panel modules.

Furthermore, the panel modules can be prefabricated functional elements, in particular prefabricated shower floor panels.

The method according to the invention is suited for panel modules which lack an applied wearing layer as well as for prefabricated panel modules furnished with a wearing layer and also for other types of water-impermeable panels. In the following, a panel module will be understood to mean not only a building panel itself but also a building panel with an applied wearing layer as well as any other type of watertight panel.

The method according to the invention comprises the following steps:
a) providing panel modules comprising a water-impermeable coating or a water-impermeable core for installation in the wet room;
b) determining an installation position of a panel module on the floor and/or the wall and/or the ceiling of the wet room;
c) attaching at least one water-resistant sealing strip section on the wall and/or on the floor and/or on the ceiling of the wet room in a position which forms an outer contour of the panel module;
d) application of a water resistant sealing adhesive to the at least one sealing strip section applied to the floor and/or the wall and/or the ceiling of the wet room in such a manner that the watertight sealing adhesive continuously underlays the edge regions of two adjacent panel modules in the fully assembled state; and
e) pressing a first panel module onto a first subregion of the sealing adhesive in a position in which the sealing strip section and a second part of the sealing adhesive protrude beyond the outer contour of the panel module such that a second panel module following the first panel module covers the part of the sealing strip section protruding beyond the first panel module and the second part of the sealing adhesive so that a seal point can be produced between the first and second panel module which prevents moisture from entering the wall, the floor or the ceiling through a joint formed between the panel modules.

To put it simply, the sealing takes place behind the panel module when using the method according to the invention. To this end, it is essential that the employed panel modules themselves have at least a water impermeable core or are water impermeable on the whole or have a water impermeable coating. Waterproof panels of plastic or plastic foam, glass, ceramic or natural stone, for example, can therefore be considered for such use. When the method according to the invention is employed, it is therefore unproblematic if water enters the joints between two panels. Water or moisture cannot be transported in a capillary manner laterally, i.e. through the lateral butting edges of the panel modules since the panel modules comprise at least a watertight core. Moisture can likewise not reach the wall, floor or ceiling since a sealing layer is provided between the panel module and the wall, floor or ceiling.

The use of the method according to the invention thus makes it possible to achieve sealing in a region that is not accessible after the panel modules have been installed. The special advantages of such a sealing method are that a surface with panel modules installed on the basis of the method according to the invention is:
for one, just as watertight as a surface which is sealed on the accessible visible side with sealing strips or other sealants after the panels have been installed, and
for another, that there is no aesthetic disruption of the visible surface caused by sealing strips or other sealants.

The panel modules provided for the application of the method according to the invention comprise a cover layer embedded in a cementitious mortar, an adhesive layer and a wearing layer. Such panel modules can be easily prefabricated industrially and installed in preferably standardized wet rooms in an efficient manner. The panel modules to be installed can have a base area of one meter by one meter, for example, with their subsequent visible side provided with an arbitrary tiled surface produced as prefabricated units. As an alternative to the prior art type of construction, in which:
building panels are first attached;
the butt joints at the edges of the building panels are then sealed; and
finally a wearing layer is applied to the sealed building panels manually and individually,
the claimed method makes it possible to install building panels already provided with the appropriate wearing surface on the wall, floor or ceiling of the wet room and to then seal them in a reliable manner. This results in a considerable reduction of the renovation time necessary at the construction site.

Another advantage is that the panel modules can be installed and sealed without having to remove the existing wall and floor covering beforehand.

Inasmuch as the employed panel module includes a building panel, the latter may be made of solid plastic, fiber-reinforced plastic such as synthetic resin, or a rigid foam body with a reinforcement layer on both sides. The rigid foam body is preferably made of HCFC-free, extruded or expanded polystyrene rigid foam, thus forming a light, insulating core. The core may be coated on at least one flat side, preferably on both flat sides, with a fiber-reinforced, hardened mortar. The building panel made of polystyrene rigid foam is water impermeable and provides lasting protection against mold growth.

A cementitious adhesive layer is understood to mean a moisture-resistant thin-bed mortar based on hydraulic binding agents.

It is advantageous that, for each wet room to be renovated, such as a kitchen or a bathroom, a certain number of panel modules can be made available. It is obvious that the greatest economic benefits are achieved by refurbishing a larger property, such as a student dormitory or a hotel with many wet rooms of the same type and size.

During the renovation, the installation position of the panel modules is first determined by marking the contours of the panel modules to be installed on the existing floor or on the existing wall of the wet room are marked. Sealing strips in the form of sealing strip sections are applied to the marked contours. Said sealing strips may in particular be foam strips, sheet metal strips, foil strips, plastic strips, sealing tape strips or construction board strips. The sealing strip sections can be rolled up when not installed and, if provided as a roll, cut to length as required. Hydrophobic sealing tapes are particularly preferred as sealing tapes.

The sealing strip sections are preferably glued on the markings. In each case, two uninterrupted longitudinal adhesive beads are preferably applied to the sealing strips at a distance from one another, which in the fully assembled state lie below the edge areas of adjacent panel modules. As an alternative to the two spaced-apart adhesive beads, a single adhesive bead can be provided that is wide enough to completely seal both edge areas of two adjacent panel modules when fully assembled.

The adhesive bead can also be applied directly to the floor or to the wall between the sealing strips in order to reinforce the bond between the wall and panel module. However, there is no further need for additional sealing strips at these points since the panel modules themselves are watertight and water can only penetrate through the joint of two adjacent panel modules or in the area of pipe openings contained in the panel modules. An uninterrupted course of the adhesive bead is decisive for effective sealing.

No sealant, adhesive or mortar needs to be applied to the rear side of the panel modules, nor does any sealing foil or sealing tape need to be bonded to it. The handling of the panel modules during installation is simplified and the working process is faster and cleaner.

Preferably the floor of a wet room is first covered with panel modules and then the walls. Alternatively, it is also possible to install the panel modules first on the walls and then on the floor or first on the ceiling and then on the walls. Of course it is also possible to cover the floor or only the walls or only the ceiling with the panel modules according to the invention and to install the otherwise conventional floor or wall coverings.

Furthermore, it is preferred that the sealing strip section glued to the wall and arranged perpendicularly to the floor is laid at least partially overlapping the sealing strip section running along the transition line from the floor to the wall, so that the watertight seal point can also be formed in the intersection area of two sealing strips.

In as much as a recess or a continuous opening, in particular for a pipe opening, is incorporated or will be incorporated into a prefabricated panel module, this region is also sealed with the method according to the invention in that:

sealing adhesive is applied to the wall around the pipe opening, a flat sealing collar is inserted and pressed into place, sealing adhesive is applied without interruptions to the sealing collar, and the prefabricated panel module with an appropriate aperture is laid upon and pressed against the adhesive beads.

As supplementary means, a plurality of spaced-apart adhesive beads can be applied to the wall, in particular in the vicinity of the pipe opening;

The object according to the invention is further achieved by a renovation kit for executing the described method, with the renovation kit comprising:

at least one prefabricated large-format panel module (10, 10'), comprising a building panel, a wearing surface and at least one intermediate cementitious adhesive layer, at least one sealing tape, from which sealing strips can be cut to size, and a water-resistant sealing adhesive.

The method recording to the invention can also be conducted on floors which exhibits a so-called "floating screed". In the case of a floor having a floating screed, insulating material in the form of styrofoam panels, for example, are first laid on a raw concrete slab. Impact sound insulation is laid toward the walls, for example in the form of foam strips. A screed concrete poured on a floor prepared in this way forms a concrete slab which "floats" on the polystyrene and has no contact with walls and floor. This prevents impact sound from being transferred to other rooms.

A special-purpose decoupling strip can be provided in order to maintain the decoupling of the floor slab from the surrounding room walls when carrying out the method according to the invention. This can be, for example, a butyl tub sealing tape. A butyl tub sealing tape comprises a polypropylene membrane that is coated with a thermoplastic elastomer (TPE). A butyl strip is applied to the TPE-coated polypropylene membrane. The butyl strip is self-adhesive had exhibits good adhesive properties. The tub sealing tape has a thickness of approximately 2 mm to 5 mm and is located in the final assembly state between the floor panels installed on the floor and the surrounding walls and decouples both from one another.

The decoupling strip is preferably as wide as the thickness of the floor panel. Since it is self-adhesive, it can be glued to an edge side of a floor panel facing the wall immediately before a floor panel is inserted. Inasmuch as this involves a corner floor panel, the decoupling strip is correspondingly bonded to two edge sides of the floor panel. Of course, it is also possible to glue the sealing strip to the wall and then align the base panel with it in a second step.

BRIEF DESCRIPTION OF THE DRAWINGS

Further advantages and features of the present invention can be taken from the following description of a preferred exemplary embodiment on the basis of the drawing. Shown are.

DETAILED DESCRIPTION OF PREFERRED EMBODIMENTS

In the following figures, identical or similar elements may be labelled with the same or similar reference numbers. In addition, the figures of the drawing, their description and the claims contain numerous features in combination. It is clear to a person skilled in the art that these features can also be viewed individually or that they can be selected to form other combinations not described here in any more detail.

Figure 1:
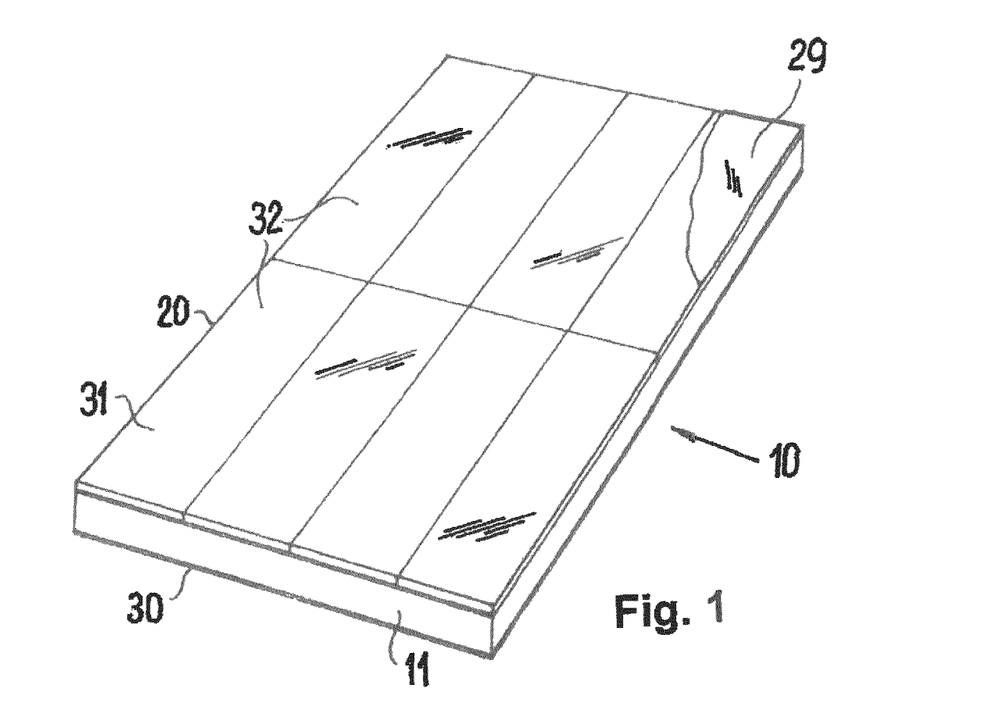
FIG. 1 is a panel module in perspective view.

Shown in FIG. 1 is a rectangular, large-format panel module 10, comprising a building panel 30 and a wearing layer 31 made of natural stone tiles 32. As an alternative to a wearing layer 31 of natural stone tiles 32, ceramic tiling may be provided, thus resulting in a panel module 10'. In the exemplary embodiment shown in the figures, panel modules 10 are installed on the floor and panel modules 10' are installed on the walls.

In the case of both panel modules 10, 10', the wearing layer 31 is connected to the building panel 30 by means of a bonding layer 12. The panel module 10 has an outer contour 20 which corresponds to the marking on the floor 14 (cf. projection in FIG. 3). A marking of the corner points of the outer contour 20 is sufficient for the subsequent application of the sealing strip sections 16, 17.

As an option, the panel modules 10, 10', in particular the wearing layer 31, can be covered with a removable protective foil 29.

The sandwich-like building panel 30 comprises a watertight core 11 made of extruded polystyrene rigid foam that is coated on both sides with a fiber-reinforced, hardened cover layer 13 of synthetic mortar.

The bonding layer 12 is made of watertight, thin-bed mortar based on hydraulic binding agents. With its cementitious surface, the thin-bed mortar forms a good bonding base. In the present case, for example, Wedi 320 tile cement is employed, a product of the company wedi GmbH, Emsdetten, Germany.

Figure 2:
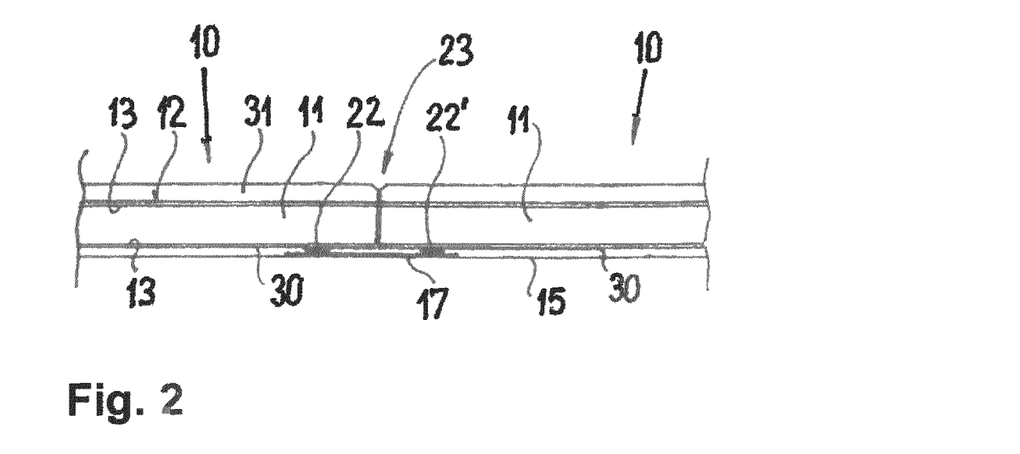
FIG. 2 is a sectional view of adjacent panel modules from FIG. 1.

The panel modules 10, 10' preferably have the format 2500 millimeters by 600 millimeters. Naturally, other format sizes can also be employed. The panel module 10 shown in FIGS. 1 and 2 is provided for installation on the floor 14 (cf. FIG. 3) and, depending on the thickness of the cover layer 13, has an overall thickness of 40 to 50 mm. Initially, that is to say prior to renovation, the floor 14 has an existing old floor covering.

Figure 6:
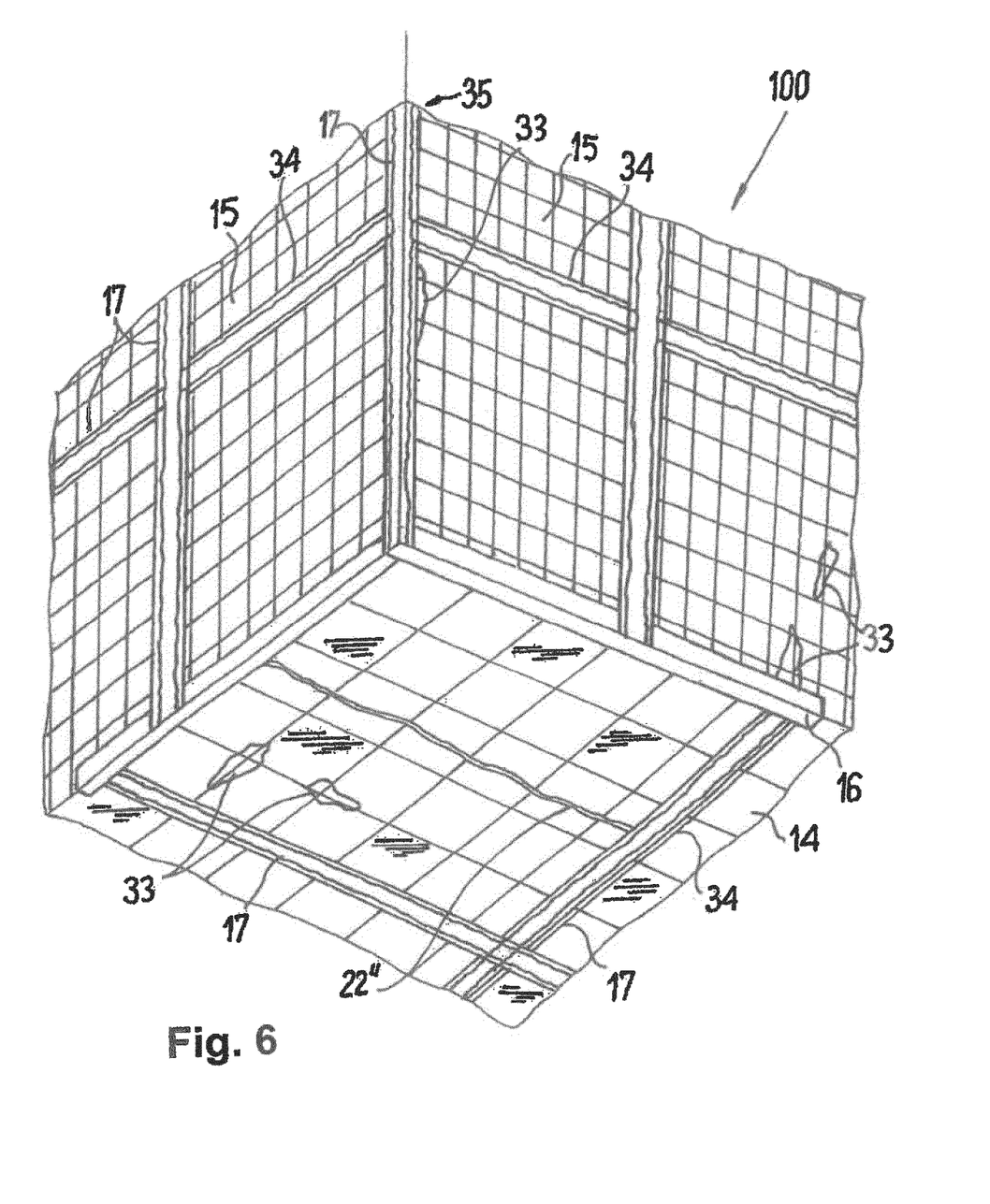
FIG. 6 is a perspective view of a corner of a wet room with laid sealing strip sections before installing the panel modules.

In FIG. 6, existing, tiled and partially damaged walls 15 and the floor 14 in a corner region of a wet room 100 can be seen. The leaks and damages in the old tiling are indicated with reference number 33. In order to repair the wet room in this situation, renovation measures must be taken.

After the installation position of each panel module 10, 10' has been determined by marking, for example colored marking, sealing strip sections 16, 17 are adhesively laid, as shown in FIGS. 3 to 6. According to FIGS. 3, 5 and 6, the sealing strip sections 16 are first laid in a manner similar to known plastic skirting boards. Thus, the sealing strip section 16 is first glued on the floor 14 and on the adjacent wall 15 across a transition area 18 of the floor 14 to the wall 15 so that it lies with one half on the floor 14 and the other half on the wall 15 in an L-shape. The sealing strip section 17 running along a corner 35 of the walls 15 arranged perpendicular to one another is also laid in an L-shape.

Figure 4:
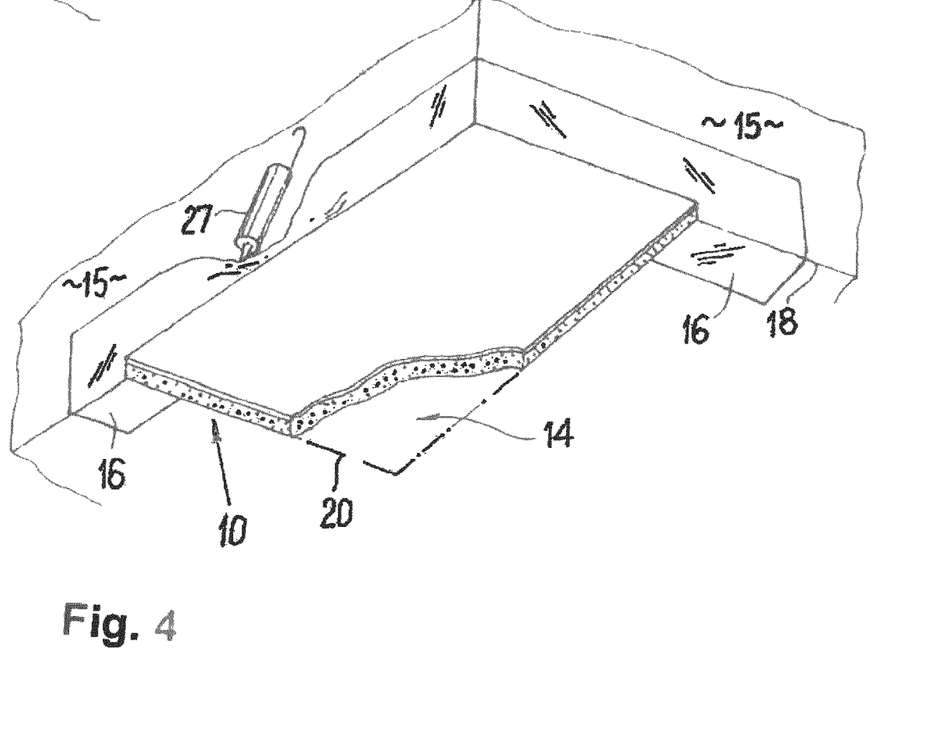
FIG. 4 is a schematic, perspective view of the installed panel module from FIG. 3.

It can be seen from FIG. 4 that the upper half of the sealing strip section 16 is glued to the wall 15 by means of an additional adhesive after the panel module 10 has been laid and pressed upon the half of the sealing strip section 16 on the floor and on the floor 14 itself. The additional adhesive is applied by a manually guided tube 27. As an alternative, an adhesive strip provided with a protective foil can first be applied to the rear side of the sealing strip section 16. The bond is made by peeling off the protective foil and pressing the sealing strip section 16 into place.

Figure 7:
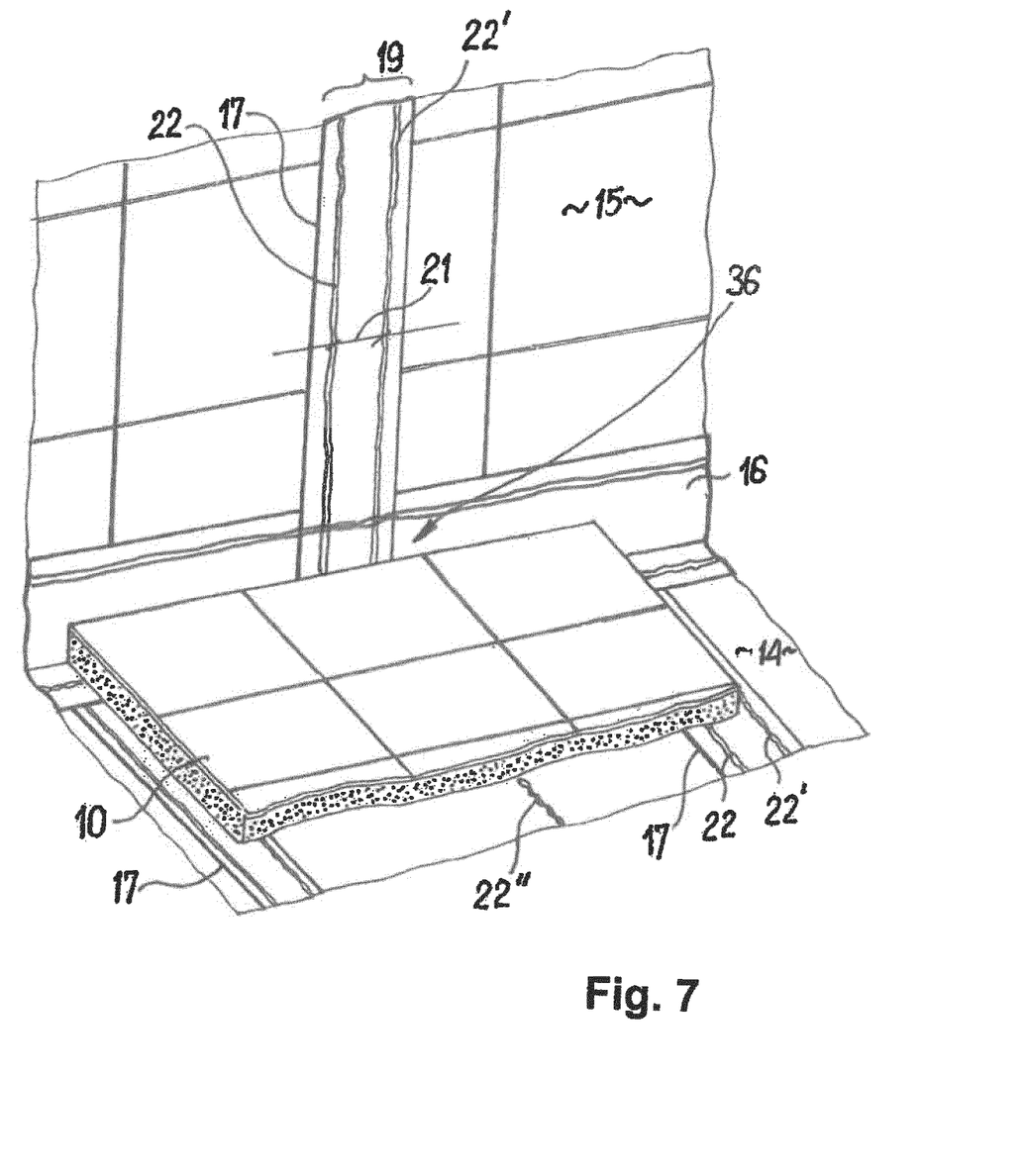
FIG. 7 is a perspective view of an arrangement of a sealing strip section running vertically on the wall with glue beads parallel to one another.
Figure 8:
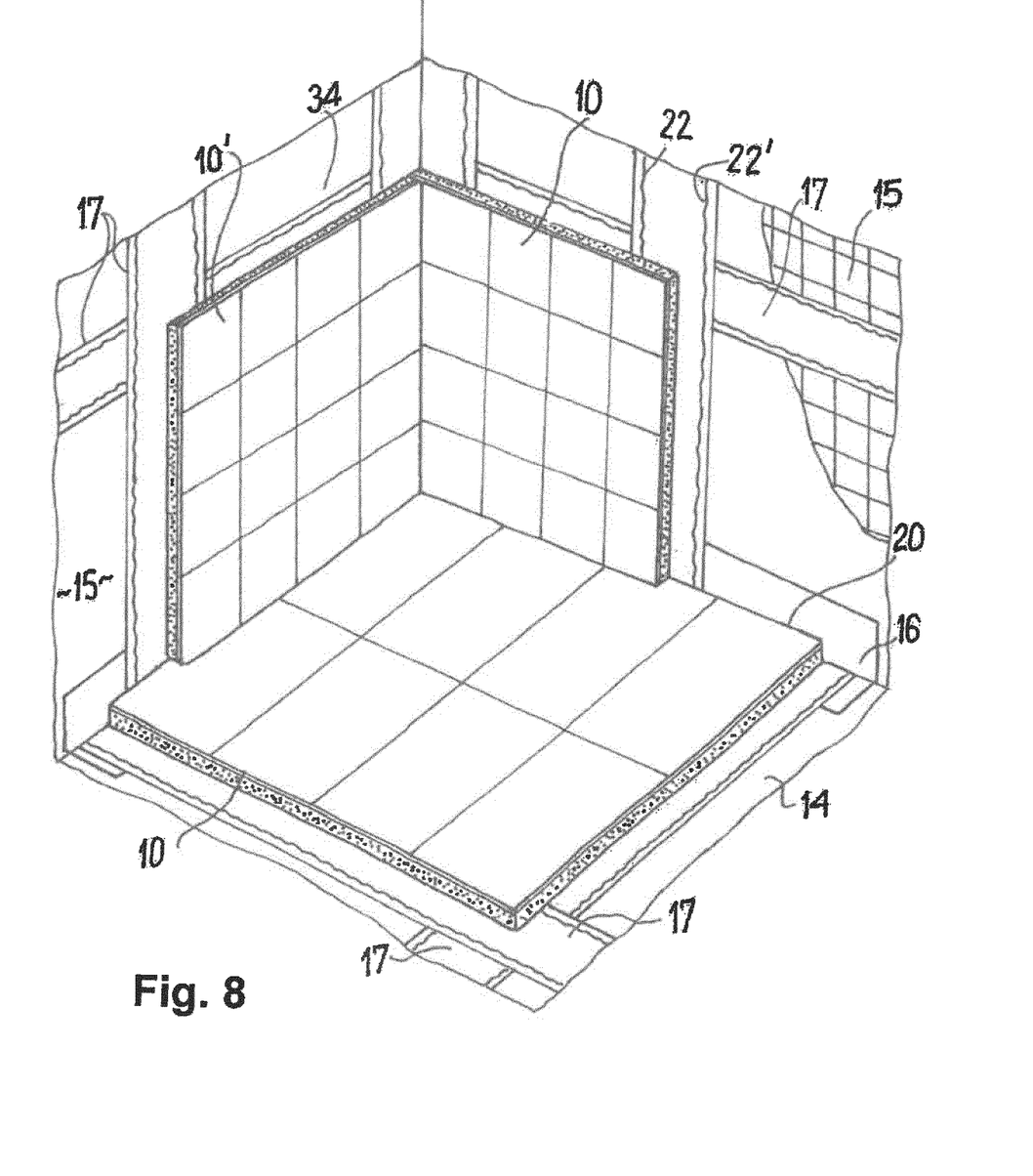
FIG. 8 is a perspective view of the corner of the wet room of FIG. 6 with installed panel modules.

Once the sealing strip section 16 has been bonded seamlessly to the wall 15, further sealing strip sections 17 are affixed to the floor 14 and to the wall 15 perpendicular and parallel to the laid L-shaped sealing strip section 16. In FIGS. 6 and 7, overlaps 36 of vertically glued sealing strip sections 17 on the applied L-shaped sealing strip sections 16 can be seen. The attached sealing strip sections 16, 17 form rectangular borders 34 (cf. FIG. 6) into which the provided panel modules 10, 10' are inserted.

Both kinds of sealing strip sections 16, 17 are preferably cut to length from a solvent-free butyl adhesive tape with good flexible properties and extreme adhesive strength.

Figure 5:
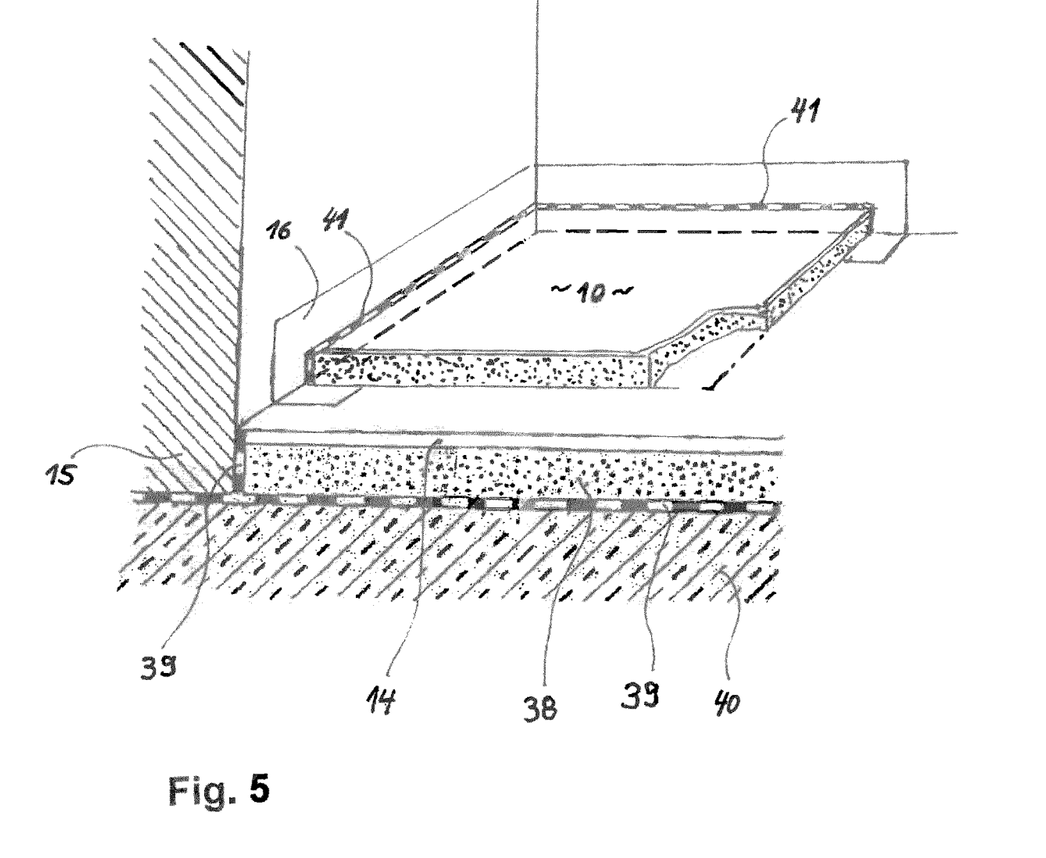
FIG. 5 is a panel module installed on a floating screed with a decoupling strip.

FIG. 5 shows a similar exemplary embodiment to FIG. 4. In contrast to the exemplary embodiment of FIG. 4, the original floor comprises a floating screed 38 which is decoupled from the wall 15 and the slab 40 by a separation layer 39. In order to maintain the decoupling of screed 38 and wall 15, an additional decoupling strip 41 is provided between the panel module 10 and the wall 15, which in the shown exemplary embodiment is a tub sealing tape with a self-adhesive decoupling strip offered by the manufacturer wedi.

Before the panel module 10, 10' is inserted, adhesive beads 22, 22' having a diameter of approximately 10 mm are applied continuously to the border 34 along its circumference. As an alternative to two parallel adhesive beads 22, 22', a single adhesive bead can be provided which is wide enough to underlay the edge region of two adjacent panel modules 10, 10' when fully assembled.

Figure 3:
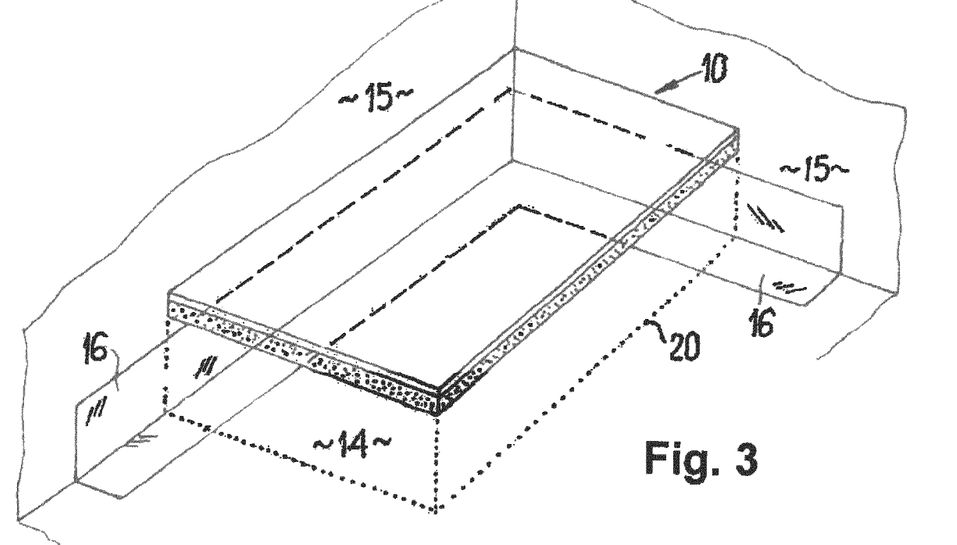
FIG. 3 is the panel module of FIG. 1 as a floor element as projected on an old floor to be renovated.

In the installation plan of the panel module 10 shown in FIGS. 3 to 5, the sealing strip section 16 projects beyond the upper edge of the panel module 10. This part of the sealing strip section 16 projecting above the panel module 10 will subsequently be covered by a wearing layer 31 to be applied to the wall 15 or by a panel module 10, thus sealing the transitional area. If the existing wall 15 is not to be faced with a wearing layer 31 or panel modules 10, it is also possible to install or truncate the sealing strip section 16 such that the upper edge of the sealing strip section 16 ends with upper edge of the panel module 10 installed on the floor. This exemplary embodiment (not shown in the figures) is particularly well-suited in cases where only the floor of the room is to be renovated as part of wet room restoration. This exemplary embodiment is in particular also well-suited when the panel module is a shower floor panel used for installing a floor-level shower in a sanitary room.

Figure 9:
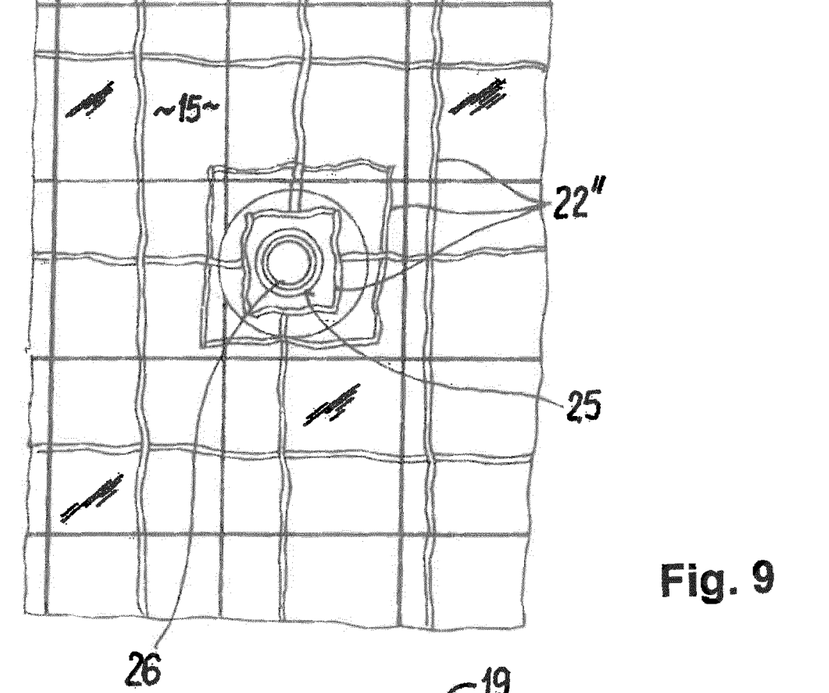
FIG. 9 is a sealing arrangement on the wall for a pipe opening.

As shown in FIGS. 6 and 9, two adhesive beads 22, 22' are applied to each sealing strip section 16, 17 at a distance 21 from one another. The double row of adhesive beads 22, 22' ensures the required tightness. Preferably at least one further adhesive bead 22" (cf. FIG. 6) is also applied between sealing strip sections 16, 17 lying opposite one another, in other words within each border 34. The use of bulging adhesive beads 22, 22', 22" also contributes to improved acoustic insulation.

Figure 10:
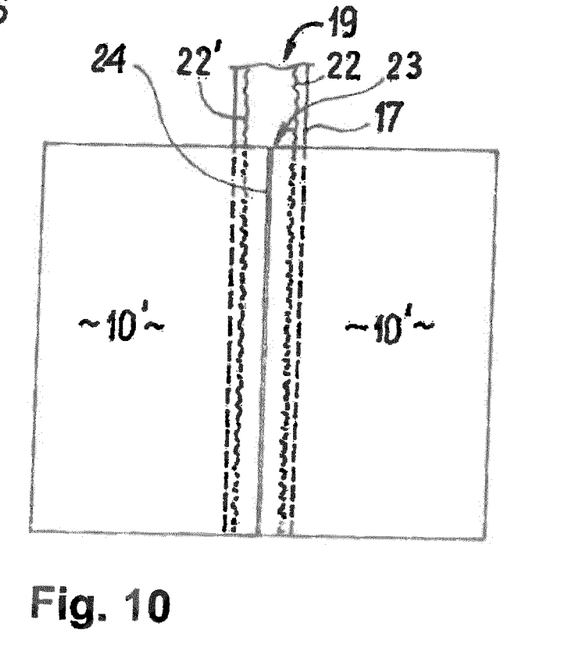
FIG. 10 is a schematic view of a joint between two installed panel modules with indicated seal point.

The panel modules 10, 10' are inserted by being pressed onto the borders 34 covered in this way with adhesive beads, resulting in overlap areas 19 of two adjoining panel modules 10, 10' which form a joint 24. Such overlap areas 19 are found at all panel module transitions. After all panel modules 10, 10' have been attached to walls 15 and floor 14, the joints 24 between the panel modules 10, 10' are filled with a joint grout and sealed in the conventional manner. Since the adhesive beads 22, 22' run in an uninterrupted manner, seal points 23 (cf. FIGS. 2 and 10) are produced between the panel modules 10; 10' which prevent the further passage of water from entering behind the panel modules 10, 10' through leaky joints 24, even when the joints 24 between the panel modules 10, 10' are badly sealed or lose their tightness through decomposition.

The necessary pipe openings can also be well sealed in the same manner with adhesive beads 22" before the insertion of the panel module 10'. FIG. 9 shows a wall section having an aperture 25 for a pipe opening 26. A sealing collar 28 is applied around the pipe opening. Before and after the installation of the sealing collar 28 a sufficient quantity of adhesive and sealant is applied to the existing wall 15 around the pipe opening 26 without interruption of the adhesive web and carefully leveled off. Additional adhesive beads 22" are also applied to the area surrounding the pipe opening 26. Only afterwards is a panel module 10' installed which has a previously cut opening (not shown) which conforms to the position of the pipe opening 26.

For all adhesive beads 22, 22', 22" a flexible, water-resistant adhesive sealant "wedi 610" was employed, a product of the company wedi GmbH, Emsdetten, Germany.

The panel modules 10, 10' can be pressed on the adhesive beads manually or mechanically, for example with vacuum support.

Figure 11:
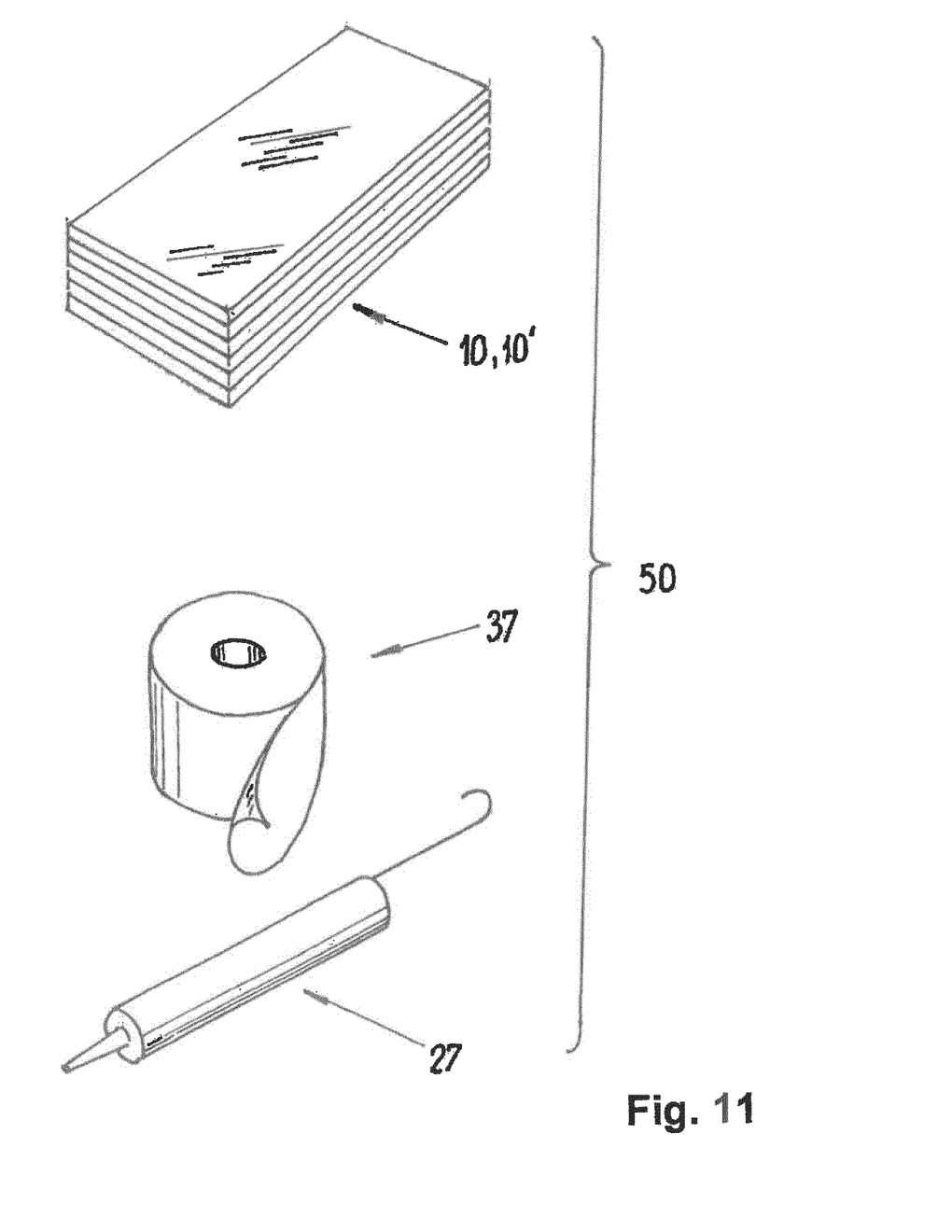
FIG. 11 is a schematic view of a sealing kit.

FIG. 11 shows a renovation kit 50, essentially comprising a coordinated number of panel modules 10, 10', sealing tape rolls 37 from which the sealing strip sections 16, 17 can be cut to size, and tube 27 with nozzle and containing the adhesive sealant "wedi 610".

The panel modules 10, 10' illustrated in the figures are building panels 30 provided with a wearing layer 31. As an alternative, or in combination with such panel modules, the method according to the invention can also be carried out with all other types of panel modules, such as natural stone slabs, building panels not provided with a wearing layer 31, glass panels, etc., inasmuch as these panel modules are watertight or at least have a watertight core.

LIST OF REFERENCE NUMBERS 10, 10' panel module
11 core
12 bonding layer
13 cover layer
14 floor (existing)
15 wall (existing)
16 sealing strip section
17 sealing strip section
18 transition area
19 overlap area
20 outer contour
21 distance
22, 22', 22" adhesive bead
23 seal point
24 joint
25 aperture
26 pipe opening
27 tube (with sealant)
28 sealing collar
29 protective foil
30 building panel
31 wearing layer
32 natural stone tile
33 damages
34 border
35 corner
36 overlap
37 sealing tape roll
38 screed (floating)
39 separation layer
40 slab
41 decoupling strip
50 renovation kit
100 wet room

What is claimed is:

1. A method for the renovation and new construction of wet rooms in which large-format panel modules (10; 10') are attached to a wall (15) and/or a floor (14) and/or a ceiling of the wet room, comprising the following steps:
   a) providing panel modules (10; 10') comprising a water-impermeable coating or a water-impermeable core (11) for installation in the wet room;
   b) determining an installation position of the panel module (10; 10') on the floor (14) and/or the wall (15) and/or the ceiling of the wet room;
   c) attaching at least one water-resistant sealing strip section (16; 17) on the wall (15) and/or on the floor (14) and/or on the ceiling of the wet room in a position which forms an outer contour (20) of the panel module (10; 10');
   d) applying a water-resistant sealing adhesive to the at least one sealing strip section (16; 17) attached to the floor (14) and/or the wall (15) and/or the ceiling of the wet room in such a manner that the watertight sealing adhesive continuously underlays the edge regions of two of the panel modules (10; 10') that are adjacent to each other in the fully assembled state; and e) pressing a first of the panel modules (10; 10') onto a first subregion of the sealing adhesive in a position in which the sealing strip section (16; 17) and a second part of the sealing adhesive protrude beyond the outer contour (20) of the panel module (10; 10') such that a second of the panel modules (10; 10') following the first of the panel modules (10, 10') covers the part of the sealing strip section (16; 17) protruding beyond the first of the panel modules (10; 10') and the second part of the sealing adhesive and that a seal point can be produced between the first and second of the panel modules (10; 10') which prevents moisture from reaching the wall (15), the floor (14) or the ceiling through a joint (24) formed between the panel modules (10; 10'), wherein for connecting the two of the panel modules (10; 10') that are adjacent to each other and are lying in one plane, the sealing strip section (17) is laid flat on the floor (14) and/or on the wall (15) or the ceiling when it is attached, so that a flat overlap area (19) of the two of the panel modules (10; 10') that are adjacent to each other and are lying in one plane and are pressed against one another is produced, wherein the two of the panel modules (10; 10') that are adjacent to each other and are lying in one plane are arranged on at least one adhesive bead (22, 22'), and wherein for connecting the two of the panel modules (10; 10') that are adjacent to each other and are arranged at an angle to one another, the sealing strip section (16) is placed with a respective half on the regions of walls (15) and/or floors (14) forming the angled connection and then adhesive beads (22, 22') are applied to the angled sealing strip section (16).

2. The method as claimed in claim 1, wherein the panel modules (10; 10') comprise a cover layer (13) embedded in cementitious mortar, an adhesive layer (12), and a wearing layer (31).

3. The method as claimed in claim 1,
wherein the two of the panel modules (10; 10') that are adjacent to each other and are lying in one plane are arranged on two adhesive beads (22, 22') lying at a distance (21) to one another.

4. The method as claimed in claim 1, wherein the sealing strip section (16), over a transition area (18) of the floor (14) to the wall (15), is first adhesively attached to the floor (14) abutting against the wall (15) and, after the panel module (10; 10') has been placed and pressed onto the floor (14), to the wall (15), by means of an additional adhesive.

5. The method as claimed in claim 4, wherein the sealing strip section (17) bonded to the wall (15) and perpendicular to the floor (14) is laid to at least partially overlap the sealing strip section (16) running along the transition line (18) of the floor (14) to the wall (15) so that watertight seal points can also be formed in the area where two sealing strips (16, 17) intersect.

6. The method as claimed in claim 1, wherein at least one adhesive bead (22") guided between the laid sealing strip sections (16; 17) is applied to the floor (14) and/or to the wall (15).

7. The method as claimed in claim 1, wherein at least one recess or continuous aperture (25) for a pipe opening (26) is worked into the panel module (10; 10').

8. The method as claimed in claim 7, wherein in order to mount the panel module (10, 10') with the continuous aperture (25) on a floor (14) or a wall (15), the following procedure is carried out:
applying sealing adhesive to the wall (15) around the pipe opening (26);

inserting a flat sealing collar (28) and pressing the flat sealing collar (28) into place;
applying sealing adhesive without interruptions to the sealing collar (28); and
pressing the prefabricated panel module (10, 10') with the continuous aperture (25) upon the adhesive beads (22").

9. The method as claimed in claim 1, wherein a decoupling strip (41) is applied on at least one outer edge of a panel module (10, 10') on the wall (15), so that the panel module (10, 10') on the wall and the wall (15) are decoupled from one another in the fully installed state.

10. The method according to claim 1, wherein the top edge of the sealing strip section (16) matches the height of the panel module (10) so that the sealing strip section (16) does not project beyond the panel module (10).

11. The method as claimed in claim 1, wherein a foam strip, a sheet metal strip, a foil strip, a plastic strip, a hydrophobic sealing tape strip or a building panel strip is provided as the sealing strip section (16; 17).

12. A renovation kit (50) for carrying out a method for the renovation and new construction of wet rooms in which large-format panel modules (10; 10') are attached to a wall (15) and/or a floor (14) and/or a ceiling of the wet room, comprising:
at least one large-format panel module (10, 10') comprising a water-impermeable coating or a water-impermeable core (11), comprising a building panel (30), a wearing surface (31) and at least one intermediate cementitious bonding layer (12);
at least one sealing tape, from which the sealing strip sections (16, 17) can be cut to size; and
a water resistant sealing adhesive,
wherein the method for the renovation and new construction of wet rooms comprises the following steps:
a) providing the panel modules (10; 10');
b) determining an installation position a first of the panel modules (10; 10') on the floor (14) and/or the wall (15) and/or the ceiling of the wet room;
c) attaching at least one water-resistant sealing strip section (16; 17) on the wall (15) and/or on the floor (14) and/or on the ceiling of the wet room in a position which forms an outer contour (20) of the first of the panel modules (10; 10');
d) applying a water-resistant sealing adhesive to the at least one sealing strip section (16; 17) attached to the floor (14) and/or the wall (15) and/or the ceiling of the wet room in such a manner that the watertight sealing adhesive continuously underlays the edge regions of the first of the panel modules (10,10') and a second of the panel modules (10, 10') adjacent to the first panel module (10; 10') in the fully assembled state; and
e) pressing the first panel module (10; 10') onto a first subregion of the sealing adhesive in a position in which the sealing strip section (16; 17) and a second part of the sealing adhesive protrude beyond the outer contour (20) of the first panel module (10; 10') such that the second panel module (10; 10') following the first panel module (10, 10') covers the part of the sealing strip section (16; 17) protruding beyond the first panel module (10; 10') and the second part of the sealing adhesive and that a seal point can be produced between the first and the second panel module (10; 10') which prevents moisture from reaching the wall (15), the floor (14) or the ceiling through a joint (24) formed between the first and the second panel module (10; 10'), wherein for connecting the two of the panel modules (10; 10') that are adjacent to each other and are lying in one plane, the sealing strip section (17) is laid flat on the floor (14) and/or on the wall (15) or the ceiling when it is attached, so that a flat overlap area (19) of the two of the panel modules (10; 10') that are adjacent to each other and are lying in one plane and are pressed against one another is produced, wherein the two of the panel modules (10; 10') that are adjacent to each other and are lying in one plane are arranged on at least one adhesive bead (22, 22'), and wherein for connecting the two of the panel modules (10; 10') that are adjacent to each other and are arranged at an angle to one another, the sealing strip section (16) is placed with a respective half on the regions of walls (15) and/or floors (14) forming the angled connection and then at least one adhesive bead (22, 22') is applied to the angled sealing strip section (16).

13. The renovation kit (50) as claimed in claim 12, wherein the sealing adhesive is contained in a tube, wherein a nozzle-like opening is provided on or attachable to the tube from which opening the sealing adhesive can be pressed out.

14. The renovation kit (50) as claimed in claim 12, wherein the sealing tape is a solvent-free butyl adhesive tape.

15. The method as claimed in claim 1, wherein the two of the panel modules (10; 10') that are adjacent to each other and are lying in one plane are arranged on a single adhesive bead that is wide enough to completely seal both edge areas of the two of the panel modules (10, 10') that are adjacent to each other and are lying in one plane.

* * * * *